United States Patent Office 2,918,072
Patented Dec. 22, 1959

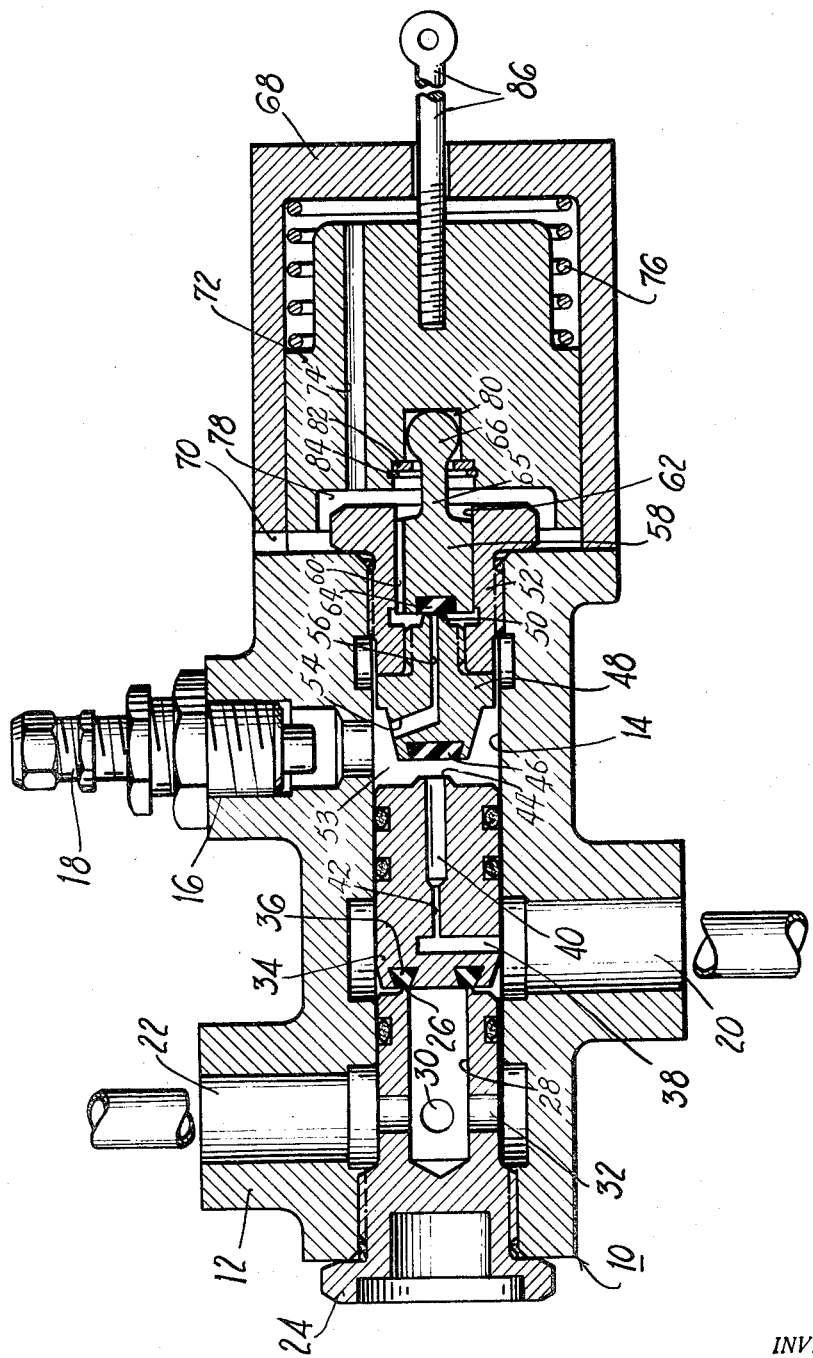
INVENTOR.
LEONARD J. BOLER
BY
William N. Antonie
ATTORNEY

2,918,072

HIGH PRESSURE SHUT-OFF VALVE

Leonard J. Boler, South Bend, Ind., assignor to Bendix Aviation Corporation, South Bend, Ind., a corporation of Delaware Application October 19, 1955, Serial No. 541,427

7 Claims. (Cl. 137—38)

My invention relates to valves and more particularly to a high pressure shut-off valve.

An object of my invention is to provide a high pressure release valve which under predetermined conditions will discharge fluid under high pressure.

Another object of my invention is to provide a high pressure release valve which will be actuated by a weight subject to acceleration forces.

A further object of my invention is to provide a high pressure shut-off valve which may be actuated by a predetermined sustained acceleration force but which will not be actuated by spurious intermittent forces equal to or greater than the predetermined acceleration force.

A still further object of my invention is to provide a high pressure shut-off valve which will release fluid under pressure to the fuel bladders of aircraft during flight when predetermined acceleration forces are exerted on said valve for a predetermined interval of time.

Another object of my invention is to provide a high pressure shut-off valve which will release fluid under pressure when a predetermined force acts on said valve for a predetermined interval of time but which will not release fluid when any force acts on said valve for less than the predetermined interval of time.

The above and other objects and features of the invention will be apparent from the following description of the device taken in connection with the accompanying drawing which forms a part of this specification.

Referring now to the single figure of the drawing, the numeral 10 designates a shut-off valve which under predetermined conditions releases the flow of a gas (e.g. nitrogen) under high pressure to a regulator (not shown). The regulated gas is then applied to the fuel bladders to pressurize the fuel during flight. The shut-off valve is comprised of a housing 12 having a central passage 14, a fill port 16 with a fill valve 18 connected thereto, a storage tank port 20, and an outlet port 22. A plug 24 having an annular valve seat 26 formed thereon is threaded into the housing 12. Axial passage 28 and radial passages 30 and 32 permit flow through the plug. A valve member 34 slidable within the central passage 14 carries an annular resilient seating portion 36 which is adapted to cover and close against the valve seat 260. Passages 38 and 40 which include a calibrated bleed 42 regulate flow through the valve member. An annular valve seat 44 is formed on the end of the valve member 34 which upon movement of the valve member will close against the resilient seating portion 46 carried by a fixed nipple 48. The nipple 48 having an annular valve seat 50 formed thereon is threaded into a plug 52 which in turn is threaded into the housing 12. A chamber 53 is formed in central passage 14 by valve member 34 and nipple 48. A passage 54 which includes a calibrated bleed 56 regulates flow through the nipple 48. A valve element 58 having a slot 60 along its outer periphery is slidable within bore 62 and carries a resilient seating portion 64 which is adapted to cover and close against the valve seat 50, thereby preventing flow through bleed 56.

The valve element 58 also has an extension 65 of reduced diameter with a spherical portion 66 on the end thereof. An end cap 68 having a slot 70 cut across the sidewall is connected to the housing 12 by suitable means. An acceleration weight 72 having a passage 74 therein is slidable within the end cap 68 and abuts a preloaded spring 76 which also lies within the end cap. The passage 74 permits a balancing of pressures on opposite sides of said acceleration weight. The acceleration weight 72 has a bore 78 which is open to the atmosphere via the slot 70 in the end cap and a bore 80 which forms a sort of socket for spherical portion 66 of extension 65. A washer 82 and retaining ring 84 enclose the spherical portion 66 within the socket so that movement of the acceleration weight will cause the unseating of the valve element 58 from the valve seat 50. A rod 86 passes through the end cap and is screwed into the acceleration weight 72 to provide for manual moving of the acceleration weight.

Operation of the shut-off valve is as follows:

A high pressure source is attached to the fill valve 18 which permits the fluid to flow into the shut-off valve 10. The fluid flows from the fill port 16 to the tank port 20 by way of chamber 53, passage 40, bleed 42, and passage 38. Since the pressure in chamber 53 builds up much faster than the pressure at tank port 20, the valve member 34 is forced to the left so that the resilient seating portion 36 closes over the annular valve seat 26 thereby preventing flow from said tank port 20 to said outlet port 22. After a sufficient amount of fluid under high pressure has been channeled to the storage tank (not shown), the pressure source is disconnected from the fill valve 18, the fill valve closing upon disconnection of the pressure source. The tank pressure and the pressure in chamber 53 will equalize at the tank design pressure after the filling operation has ceased. The valve member 34 remains seated on valve seat 26 due to the pressures exerted thereon.

The valve is actuated by predetermined acceleration forces which act on the acceleration weight 72. During flight when the predetermined acceleration forces occur, the weight 72 will move from its neutral position to the right against the force of the preloaded spring 76. Movement of the weight will unseat valve element 58 from annular valve seat 50. With the weight moved back there will be flow from the storage tank to the atmosphere by way of tank port 20, passage 38, bleed 42, passage 40, chamber 53, passage 54, bleed 56, slot 60, bore 78, and slot 70. The pressure in chamber 53 drops rapidly as a predetermined function of time, until the force on the back of the valve member 34 is less than the force on its face. When this unbalanced condition occurs, the valve member 34 will move to the right until valve seat 44 abuts the resilient seating portion 46 thereby preventing further flow to the atmosphere from the tank port but permitting flow from said tank port to said outlet port by way of passages 28, 30, and 32.

The shut-off valve is designed so that there is a predetermined time lag between the moment the acceleration weight 72 moves back unseating the valve element 58 and the moment the valve member 34 is moved off of the valve seat 26. Consequently unwanted forces of short duration will not unseat valve member 34 since these spurious forces may move the acceleration weight 72 and valve element 58 but not for a long enough period to unseat the valve member 34. The size of bleeds 42 and 56 determines the time lapse between the unseating of valve element 58 and valve member 34. The acceleration weight may be caused to move at any predetermined acceleration force by varying the preload of spring 76. Any shock loads in excess of the predetermined acceleration force which occur for a time duration less than the design time lapse will not affect valve member 34. The valve member 34 will move away from valve seat 26 thereby permitting flow from the tank port 20 to the outlet port 22 only when the forces acting on the weight 72 are greater than the forces which the calibrated spring 76 can withstand and when these forces act on the weight 72 for an interval of time which is greater than the design time delay. When the acceleration forces fall below the predetermined value, the weight 72 will return to its normal position. Since the pressure behind the valve member 34 will have been bled off to the atmosphere, the valve member 34 will be held open by the tank pressure for the remainder of the flight. The regulator will maintain a predetermined pressure on the fuel bladders as long as the pressure in the tank remains above this predetermined value.

Although this invention has been described in connection with a specific embodiment, the principles are susceptible of numerous other applications that will readily occur to persons skilled in the art.

Having thus described the various features of the invention, what I claim as new and desire to secure by Letters Patent is:

1. A shut-off valve comprising a housing having a central passage therein, a fill port, a tank port, and an outlet port, said ports communicating with said central passage, a valve member slidable within said central passage for controlling pressurized flow between said tank port and said outlet port, a resilient seating portion and an annular valve seat on opposite ends of said valve member, a chamber formed in said central passage adjacent said annular valve seat, a passage which includes a calibrated bleed regulating flow through said valve member, said passage communicating said tank port with said chamber, a second valve seat located between the tank and outlet ports and associated with the resilient seating portion of said valve member, said valve member being held on said second valve seat by the pressure in said chamber acting on one end thereof, a nipple located within said central passage, a second resilient seating portion and a third valve seat located on opposite ends of said nipple, a passage which includes a second calibrated bleed regulating flow through said nipple, said second bleed having a greater capacity than said first mentioned bleed, a plug having a bore therein located on one end of said central passage, a valve element slidable within said bore, a third resilient seating portion located on one end of said valve element, said third seating portion being associated with said third valve seat, an axial slot formed on the outer periphery of said valve element for communicating said chamber with the atmosphere when said valve element is unseated from said third valve seat thereby relieving the pressure in said chamber and causing said valve member to unseat from said second valve seat and seat on said second resilient seating portion, an acceleration weight attached to said valve element, said weight being movable as a result of acceleration forces acting thereon, and a preloaded spring exerting a force against said acceleration weight, said acceleration weight being capable of unseating said valve element after overcoming said preloaded spring.

2. A shut-off valve comprising a housing having a central passage therein, a fill port, a tank port, and an outlet port, said ports communicating with said central passage, a valve member slidable within said central passage for controlling pressurized flow between said tank port and said outlet port, a resilient seating portion and a valve seat on opposite ends of said valve member, a chamber formed in said central passage adjacent said valve seat, passage means communicating said tank port with said chamber, a second valve seat located between the tank and outlet ports and associated with the resilient seating portion of said valve member, said valve member being held on said second valve seat by the pressure in said chamber acting on one end thereof, a nipple located within said housing, a second resilient seating portion and a third valve seat formed on said nipple, a plug having a bore therein located in said central passage, a valve element slidable within said bore, a third resilient seating portion located on said valve element, said third resilient seating portion being associated with said third valve seat, an acceleration weight attached to said valve element, said weight being movable as a result of acceleration forces acting thereon, a preloaded spring exerting a force against said acceleration weight, said valve element being caused to unseat by movement of said acceleration weight, and second passage means communicating said chamber with the atmosphere upon movement of said weight thereby relieving the pressure in said chamber and causing said valve member to unseat from said second valve seat and seat on said second resilient seating portion, said second passage means having a greater capacity than said first mentioned passage means.

3. A shut-off valve comprising a housing having a central passage therein, a fill port, a tank port and an outlet port, said ports communicating with said central passage, a valve member slidable within said central passage for controlling pressurized flow between said tank port and said outlet port, a resilient seating portion and a valve seat on opposite ends of said valve member, a chamber formed in said central passage adjacent said valve seat, passage means communicating said tank port with said chamber, a second valve seat formed within said housing and located between the tank and outlet ports, said second valve seat being associated with the resilient seating portion of said valve member, said valve member being held on said second valve seat by the pressure in said chamber acting on one end thereof, a nipple fixed within said central passage, a second resilient seating portion located on one end of said nipple, said second resilient seating portion making contact with the valve seat formed on said valve member upon movement of said valve member, a third valve seat located on said nipple, a slotted valve element located within said central passage, a third resilient seating portion located in said slotted valve element, said third resilient seating portion being associated with said third valve seat, an acceleration weight attached to said slotted valve element, said weight being movable as a result of acceleration forces acting thereon, and means for resisting movement of said weight, movement of said weight causing said slotted valve element to be unseated from said third valve seat thereby relieving the pressure in said chamber by communicating the latter to the atmosphere and causing said valve member to unseat from said second valve seat and seat on said second resilient seating portion.

4. A high pressure shut-off valve comprising a housing having a central passage therein, a fill port, a tank port, and an outlet port, said ports communicating with said central passage, a valve member slidable within said central passage from a first position to a second position for controlling pressurized flow between said tank port and outlet port, a chamber formed in said central passage adjacent said valve member, said valve member being held in said first position by the pressure in said chamber acting on one end thereof, a passage which includes a first calibrated bleed formed in said valve member, said passage communicating said chamber with said tank port, a nipple fixed within said central passage, a passage which includes a second calibrated bleed formed within said nipple, said last named passage communicating with said chamber and having a greater capacity than said first named passage, a valve element normally preventing flow through said second calibrated bleed, an acceleration weight connected to said valve element and movable as a result of acceleration forces acting thereon, means for resisting movement of said weight, said acceleration weight being capable of moving said valve element to an open position thereby permitting flow from said tank port to the atmosphere via said first and second calibrated bleeds, said valve member moving from said first position to said second position after said valve element has moved to and remained in the open position for a time sufficient to relieve the pressure in said chamber, movement of said valve member to said second position preventing further flow to said atmosphere but permitting flow from said tank port to said outlet port.

5. A high pressure shut-off valve comprising a housing having a central passage therein, a fill port, a tank port, and an outlet port, said ports communicating with said central passage, a first valve means within said central passage having a first and second position for controlling flow between said tank port and outlet port, a second valve means within said central passage, a chamber formed in said central passage between said first and second valve means, said first valve means being held in said first position by the pressure in said chamber acting against said means, passage means communicating said chamber to said tank port and the atmosphere, a weight attached to said second valve means and movable as a result of predetermined forces acting thereon, means for opposing movement of said weight, movement of said weight causing said second valve means to move from a closed position to an open position thereby permitting flow of high pressure fluid from said tank port to the atmosphere, said first valve means moving from said first position to said second position after said second valve means has moved to and remained in the open position for a time sufficient to relieve the pressure in said chamber, movement to said second position preventing further flow to said atmosphere but permitting flow from said tank port to said outlet port.

6. A shut-off valve comprising a housing having a central passage therein, a fill port, a tank port, and an outlet port, said ports communicating with said central passage, a first valve means within said central passage for controlling flow between said tank port and said outlet port, said first valve means having a first and second position, a first calibrated bleed within said first valve means, a second valve means within said central passage for controlling movement of said first valve means, said second valve means having an open and a closed position, a second calibrated bleed within said second valve means, a chamber formed between said first and second valve means, said first bleed communicating said chamber with said tank port and said second bleed communicating said chamber with the atmosphere when said second valve means is in the open position, a weight having a neutral position attached to said second valve means for controlling movement of said second valve means, said weight being movable as a result of predetermined forces acting thereon, resilient means opposing movement of said acceleration weight, movement of said weight away from said neutral position for a predetermined interval of time causing said second valve means to open for a time sufficient to relieve the pressure in said chamber, said first valve means moving from said first to said second position as a result of the pressure drop in said chamber thereby preventing further flow to said atmosphere but permitting flow from said tank port to said outlet port, said time being a function of the first and second calibrated bleeds and said tank pressure.

7. A shut-off valve comprising a housing having a central passage therein, a fill port, a tank port, and an outlet port, said ports communicating with said central passage, a first valve seat formed in said central passage between said tank port and said outlet port, a nipple fixed within said central passage having second and third valve seats formed thereon, a valve member slidable in said central passage from said first valve seat to said second valve seat for controlling flow between said tank port and outlet port, a chamber formed in said central passage between said valve member and said nipple communicating with said fill port, said valve member being held against said first valve seat by the pressure in said chamber acting on one end thereof, a passage which includes a calibrated bleed formed in said valve member for communicating said chamber with said tank port, a second passage which includes a second calibrated bleed formed within said nipple, said second passage having a greater capacity than said first pasage, a valve element seatable on said third valve seat for controlling flow through said second passage and permitting communication between said chamber and the atmosphere, means for opposing movement of said valve element, and means for unseating said valve element from said third seat, movement of said valve element away from said third valve seat for a time sufficient to relieve the pressure in said chamber causing said valve member to seat on said second valve seat thereby prohibiting flow to the atmosphere but permitting flow from said tank port to said outlet port.

References Cited in the file of this patent

UNITED STATES PATENTS

| | | |
|---|---|---|
| 143,920 | Mayer | Oct. 21, 1873 |
| 1,720,379 | Robertson | July 9, 1929 |
| 2,055,576 | Hollerith | Sept. 29, 1936 |
| 2,295,871 | Sloan | Sept. 15, 1942 |
| 2,672,335 | Keller | Mar. 16, 1954 |
| 2,677,417 | Logan et al. | May 4, 1954 |